US011645382B2

(12) United States Patent
Krietzman et al.

(10) Patent No.: US 11,645,382 B2
(45) Date of Patent: May 9, 2023

(54) SENTINEL SYSTEM FOR AN ONLINE DEVICE

(71) Applicants: Mark Krietzman, Palos Verdes Estates, CA (US); Damon L Cusato, Malibu, CA (US)

(72) Inventors: Mark Krietzman, Palos Verdes Estates, CA (US); Damon L Cusato, Malibu, CA (US)

( * ) Notice: Subject to any disclaimer, the term of this patent is extended or adjusted under 35 U.S.C. 154(b) by 0 days.

(21) Appl. No.: 13/838,775

(22) Filed: Mar. 15, 2013

(65) Prior Publication Data
US 2014/0047540 A1  Feb. 13, 2014

Related U.S. Application Data

(60) Provisional application No. 61/612,208, filed on Mar. 16, 2012, provisional application No. 61/659,472, filed on Jun. 14, 2012, provisional application No. 61/717,072, filed on Oct. 22, 2012.

(51) Int. Cl.
*G06F 21/50* (2013.01)
*G06F 9/445* (2018.01)
*G06F 21/55* (2013.01)
*G06F 21/62* (2013.01)
*H04W 12/02* (2009.01)

(52) U.S. Cl.
CPC .......... *G06F 21/50* (2013.01); *G06F 9/44505* (2013.01); *G06F 21/554* (2013.01); *G06F 21/6245* (2013.01); *H04W 12/02* (2013.01)

(58) Field of Classification Search
CPC .... G06F 21/50; G06F 9/44505; G06F 21/554; G06F 21/6245; H04W 12/02
See application file for complete search history.

(56) References Cited

U.S. PATENT DOCUMENTS

| 7,913,092 B1* | 3/2011 | Hiltunen | G06F 21/54 |
| | | | 726/1 |
| 2007/0016914 A1* | 1/2007 | Yeap | G06F 21/554 |
| | | | 719/328 |
| 2008/0016339 A1* | 1/2008 | Shukla | G06F 21/54 |
| | | | 713/164 |

* cited by examiner

*Primary Examiner* — Mohammad W Reza (57) ABSTRACT

A Sentinel System For an Online Device ("SOD") is disclosed that is capable of protecting a computing device from mining and tracking.

7 Claims, 9 Drawing Sheets

Note: 401-405 represent data privacy filter including core Kernel Augmentation 401 and non-core filters 403 and 405.

SENTINEL SYSTEM FOR AN ONLINE DEVICE

CROSS-REFERENCE TO RELATED APPLICATIONS

This application claims priority under 35 U.S.C. § 119(e) to U.S. Non-Provisional Application Ser. No. 61/612,208, titled "Augmentation Of Core Kernel Function," filed Mar. 16, 2012, which is incorporated into this application by reference in its entirety. This application also claims priority under 35 U.S.C. § 119(e) to U.S. Non-Provisional Application Ser. No. 61/659,472, titled "Augmentation Of Core Kernel Function," filed Jun. 14, 2012, which is incorporated into this application by reference in its entirety. This application further claims priority under 35 U.S.C. § 119(e) to U.S. Non-Provisional Application Ser. No. 61/717,072, titled "Sentinel Systems and Methods," filed Oct. 22, 2012, which is incorporated into this application by reference in its entirety.

BACKGROUND OF THE INVENTION

1. Field of the Invention

This invention relates generally to computing devices, and more particularly, to securing computing devices from unauthorized access of metadata on the computing devices.

2. Related Art

At present, the growth of smart devices such as, for example, cellular telephones (including smartphones like iPhone®, Android® and Microsoft Mobile based mobile phones), mobile, desktop, and tablet (such as iPads®, Android based tablets, and Microsoft based tablets) computers, PDAs, gaming systems, interactive television platforms, navigation systems, smart phones, and the like which can access cellular telecommunication networks, the Internet, or other similar telecommunication networks are growing at a rapid pace. These smart devices typically have cameras, microphones, and extensive databases, libraries, tables and registers of User activities. They contain vast amounts of personal data such as contacts, habits and usage, help Users navigate with GPS positioning, browse the Internet, buy products, text, instant message ("IM"), send and receive emails, share photos and videos, interact with websites and the like. As such, these smart devices are capable of producing, recording, and storing large amounts of personal data related to a user of a given smart device.

Examples of this type of data include GPS position of the smart device, track data of the smart device such as location, time, time at a location, websites visited, products or items viewed, keywords typed, words spoken, commands, texts, media watched, purchases, contact lists, calls made and received, files uploaded or downloaded, pictures and video taken, etc. In addition to these types of smart devices, other pseudo-smart devices are also growing at a rapid pace. These pseudo-smart devices include non-traditional computing devices such as, for example, household appliances and devices which have now been updated with circuitry that includes microprocessors with software operating systems ("OS") and network access ports that allow connection to the Internet or cellular telecommunication networks. As such, personal data related to seemly mundane things and tasks such as, for example, making toast, dimming and programming lights, controlling a home's air conditioner or heater, programming or monitoring a security system, watering plants and the yard, doing laundry, preheating an oven, controlling the temperature in a refrigerator or freezer, making coffee, switching television stations, reducing the volume of specific commercials, may also be collected. Generally, this information is known as "metadata" which is a neologism that was originally loosely defined as data about data but now also includes data about the containers of the data (i.e., structural metadata), descriptive metadata which deals more about individual instances of application data and the data content, and sometimes includes what is generally known as metacontent (i.e., content about content).

Modern computing devices, including so called smart devices often contain or can generate such things as, for example, contacts, photographs, GPS information, Internet Protocol ("IP") addresses, Media Access Control ("MAC") addresses, voice recognition, biometric functions, facial recognition, libraries of User data and metadata about the applications (generally known as "apps") and functions of the smart device. Additionally, these devices may also record a User's Internet history, device serial number, OS type and version, make of the smart device, location visited, Wi-Fi® or Bluetooth® sites either accessed or sniffed, site access times and dates, data rates, etc.

As a result these smart and pseudo-smart devices produce large amounts of metadata related to the Users of these types of devices which has value for governmental, commercial and nefarious purposes. Specifically, this type of metadata pierces the cloak of a User's privacy and allows for the potential disclosure of their personal activities to third parties.

The within disclosure recognizes personal expectations of privacy and evolving laws and discloses, in some implementations, a method and system to protect the individual's privacy and life from exploitation.

Facebook markets to the exact spaces minors frequent and a child can set up an account by altering birthdates. The problem of underage accounts is not new, nor is unexpected yet the Agglomerator continues to reap enormous benefits from this exploitation and selling access to minors to advertisers to solidify brand loyalty at a very young age. Facebook, as one example, screens applicants by asking for their birth date and rejecting those too young. Because joining doesn't require a credit card, though, a preteenager can slip through by falsifying his or her birth date. Facebook entices children to post personal information on Facebook that can be publicly viewed thereby skirting, ignoring, avoiding, the protections afforded by the Federal Children's Online Privacy Protection Act of 1998 (COPPA).

As stated by the NY Times "In May, Consumer Reports announced that 7.5 million kids age 12 and younger are on Facebook. The magazine called this "troubling news," in no small part because their presence is at odds with federal law, which bars Web sites from collecting personal data about kids under 13 without permission from their parents. "Clearly, using Facebook presents children and their friends and families with safety, security and privacy risks," Consumer Reports concluded . . . " (http://www.nytimes.com/2011/10/16/magazine/why-facebook-is-after-your-kids.html).

Unfortunately, while these devices are growing at an ever increasing rate in modern society, most Users of these types of devices either do not understand or underestimate the amount and nature of the data that is being collected about them. Numerous articles have recently surfaced about the nature of this metadata and how it is being collected by the devices (either inherently or through installed applications), mined by third parties, and utilized to either assist or track and control the User.

Recent examples of this include articles of Facebook® and Twitter® stalkers that stalk fellow Facebook® and Twitter® members, at times with unfortunate conclusions. Additionally, several new websites and applications have surfaces that make it easier to track and keep tabs on friends, or in some case, strangers. An extreme example of this is an application named "Creepy" presently downloadable from the website http://ilektrojohn.github.com/creepy/. According to the developer of this application, Creepy can track a person's location on a map using photos uploaded to Twitter® or Flickr®.

To use Creepy, a User downloads the application and then types in the Twitter® handle or Flickr® I.D. of the person you want to track. The application automatically searches the account for pictures tagged with geodata and then displays the locations on a map. In the past most cameras and video recorders did not instantly attach location data (or geographic coordinates) to photos and videos. But many smartphones, such as the iPhone®, Android®, and Microsoft Mobile phones, automatically embed the latitude and longitude at which the picture was taken into each photo's metadata. Similar to Creepy, a team of security analysts launched a similar website called ICanStalkU.com. It automatically scans Twitter® for images with location data and then translates those geographic coordinates into actual street addresses or place names.

Another potentially disturbing application for smartphones was produced by a startup company named NeuAer (www.newaer.com) from Los Angeles, Calif. that won the "Best Tech" prize at a launch conference in San Francisco. This application named "ToothTag" allows people to share their location and track the location of others through their cellphones' radio signals (such as, for example, Wi-Fi®, Bluetooth®, GPS and near-field communication signals) which are utilized as digital signatures. In an example of operation, the application may be set to automatically check a User into the User's favorite coffee shop after the User has been there for a certain amount of time, or User could use it to tag the User's parked car to help the User find it. The application allows the User to tag the radio signals of other people's cellphones. Once the User's smartphone registers a friend's smartphone signal, it will automatically tell the User when that friend is nearby. At first the application seems like a great feature if the User wants to meet up with friends for a night on the town, but what happens when a friendship or love affair turns sour?

In a related problem, Facebook® was accused of a massive 'data grab' after encouraging users to allow it to automatically synchronize photos from their mobile devices to the social networks servers by activating its new Photo Sync application, which will automatically upload each picture to a private album. Unfortunately, whether or not Users decide to share the photos on their public newsfeed, Facebook® itself will still have access. That means Facebook® will be able to mine those files for their metadata, including the location where the photo was taken, as well as use its facial recognition technology to spot those pictured.

As a result, over time, Facebook® will be able to build up a comprehensive database of where Users have been, and with whom, from information they automatically give to the company. In a recent article (http://www.dailymail.co.uk/sciencetech/article-2242255/Facebook-accused-massive-data-grab-new-service-automatically-uploads-phone-pictures.html), a deputy director of civil liberties campaign group Big Brother Watch, said "This provides a stark warning about the loss of control experienced once you have installed an application to your mobile phone."

While Facebook's help pages stresses that the album remains private, it can be assumed that the social network will benefit from swathes of picture metadata that will enable it to find out unprecedented details about Users' lives.

Potentially more troubling is the tracking of minors which is especially disturbing, and in the "May, Consumer Reports announced that 7.5 million kids age 12 and younger are on Facebook®. The magazine called this "troubling news," in no small part because their presence is at odds with federal law, which bars Web sites from collecting personal data about kids under 13 without permission from their parents. "Clearly, using Facebook presents children and their friends and families with safety, security and privacy risks," Consumer Reports concluded . . . " (http://www.nytimes.com/2011/10/16/magazine/why-facebook-is-after-your-kids.html). The specific federal law that the article is referring to is the Children's Online Privacy Protection Act of 1998 TITLE XIII-CHILDREN'S ONLINE PRIVACY PROTECTION.

Beyond the above listed extreme examples of either unauthorized or unappreciated uses of a User's metadata, it is noted that many companies and organizations are actively trying to generate from, activity receive, and analyzing metadata from Users either directly or indirectly. Examples of these efforts in the art include: U.S. Pat. No. 5,970,482, titled "System For Data Mining Using Neuroagents," issued Oct. 19, 1999, to Pham et al.; U.S. Pat. No. 7,143,091, titled "Method and Apparatus For Sociological Data Mining," issued Nov. 28, 2006, to Charnock et al.; U.S. Pat. No. 7,962,750, titled "System for Tracking End-user Electronic Content Usage," issued Jun. 14, 2011 to Gruse et al.; U.S. Pat. No. 7,991,827, titled "Network Analysis System And Method Utilizing Collected Metadata," issued Aug. 2, 2011, to Whitmore et al.; U.S. Pat. No. 8,275,649, titled "Mining Life Pattern Based On Location History," issued Sep. 25, 2012 to Xie et al.; U.S. Pat. No. 8,315,981, "Data Mining Systems And Methods For Heterogeneous Data Sources," Nov. 20, 2012 to Gokhale et al.; U.S. patent application Ser. No. 11/544,300, titled "Session Based Web Usage Reporter," published Apr. 10, 2008 as Publication No. US 2008/0086558 A1, to Bahadori et al.; and U.S. patent application Ser. No. 13/294,992, titled "Data Mining To Determine Online User Responses To Broadcast Messages," published May 17, 2012 as Publication No. US 2012/0123854 A1, to Anderson et al., all of which are herein incorporated in their entireties.

As such, there is a need for system and method capable of protecting a computing device from mining and tracking.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION OF THE INVENTION

In order to solve the problems described earlier, a Sentinel System For an Online Device ("SOD") is disclosed.

Figure 1:
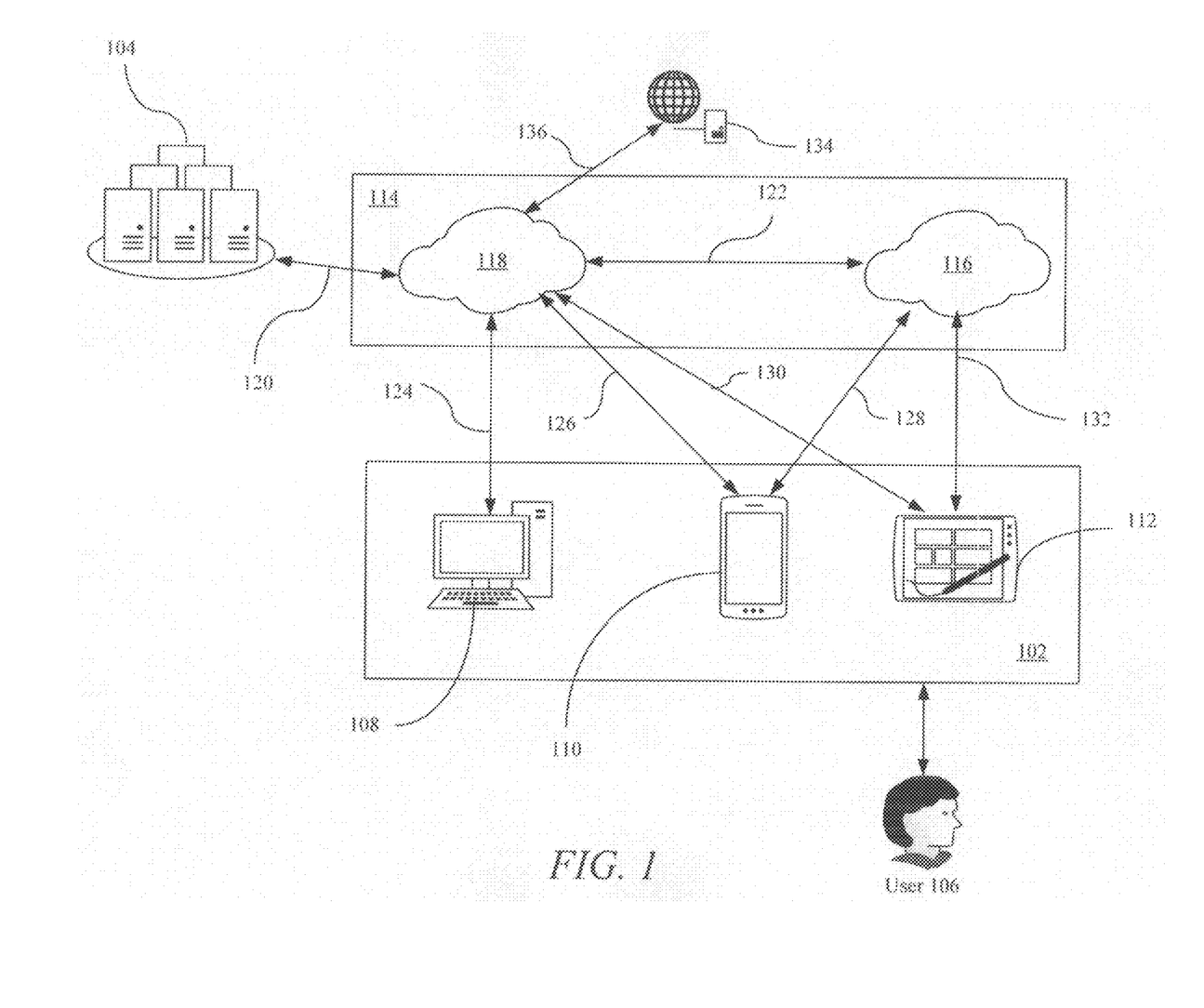
FIG. 1 is a block diagram of an example of an implementation of communication network between a computing device and an Agglomerator, where the computing device includes a Sentinel System For an Online Device ("SOD") in accordance with the invention.

FIG. 1 is a block diagram 100 of an example of an implementation of communication network between a computing device 102 and an Agglomerator 104, where the computing device includes the SOD in accordance with the invention. In FIG. 1, a user 106 is shown interfacing with the computing device 102. The computing device 102 may be a machine or device capable of performing calculations automatically. Examples of the computing device 102 may include smartphones, laptops, notebook, netbook, and desktop computers, tablets, automobile navigators, PDAs, gaming systems, set-top cable boxes, satellite network boxes, or smart devices with processors, operating systems and memory, where the smart devices may be cloud based, discreet or a hybrid of cloud and discreet. In this example, the computing device 102 may be a computer 108 (such as, for example, a desktop, laptop, or netbook personal computer ("PC")), smartphone 110, or tablet computer 112 (such as, for example, an iPad®, Android®, or Microsoft Windows® based tablet). The computing device 102 may be in signal communication with the Agglomerator 104 via a telecommunication network 114. The telecommunication network 114 may include a wireless network 116 and the Internet 118. The wireless network 116 may be a cellular telephone network. Since the computing device 102 is in signal communication with telecommunication network 114, the computing device 102 may be also referred to as an "online device" because it is capable of "going online" when it communicates with the telecommunication network 114. The computing device 102 includes SOD.

The Agglomerator 104 refers to entities or organizations such as search engines Google®, Yahoo®, Microsoft®, social networks like AOL® and Facebook®, archive of "Big Data" such as Teradata, Vertica. Agglomerators may include ISP providers, credit bureaus such as Transunion, cellular network providers, Wi-Fi provider, or any entity, individual or group tracking a user's data or metadata. Agglomerators track, collect, catalog, analyze, sell, and use User Footprints including but not limited to browsing, tweeting, blogging, posting, commenting, likes and dislikes, charities, responses, spending, spending choices or selections, investments, investment choices or selections, buying, selling, contacts, usage of services, IP addresses, MAC addresses of hardware associated to User, IP provider of User, friends of User, connections of User, personal information, job information, health information, and business information. A Direct Source may also be an Agglomerator. As laws are evolving globally on this topic the term Agglomerator is defined to have the broadest interpretation with respect to data collection. In this example, the Agglomerator 104 may include a one or more servers.

The Agglomerator 104 is in signal communication with the telecommunication network 114 via signal path 120. Typically, the Agglomerator 104 would be in signal communication with Internet 118 via signal path 120. The wireless network 116 would also be in signal communication with the Internet 118 via signal path 122. In this example, the computing device 102 would be in signal communication with the Internet 118, wireless network 116 or both. Specifically, if the computing device 102 is the computer 108 which is a noncellular type of device, the computer 108 would be in signal communication with the Internet 118 via signal path 124, which may be a wired connection, such as, for example, a dial up modem connection or broadband connection, or wireless connection such as, for example, a WiFi® or Bluetooth® connection. If, instead, the computing device 102 is a wireless device such as the smartphone 110, the smartphone 110 would be in signal communication with the either the Internet 118 directly via signal path 126 or via wireless network 116 via signal paths 128 and 122. Similarly, If the computing device 102 is a wireless device such as the tablet computer 112, the tablet computer 112 would be in signal communication with the either the Internet 118 directly via signal path 130 or via wireless network 116 via signal paths 132 and 122.

It is appreciated by those skilled in the art that the circuits, components, modules, and/or devices in this disclosure are described as being in "signal communication" with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any "signal path" between the circuits, components, modules, and/or devices that allows signals and/or information to pass from one circuit, component, module, and/or device to another and includes wireless or wired signal paths. The signal paths may be physical such as, for example, conductive wires, electromagnetic wave guides, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In an example of operation, the User 106 may access the Internet 118 either to purposely access information on remote server or website 134 which is in signal communication with the Internet 118 via signal path 136 or without the User's 106 knowledge via the operation of an application on the computing device 102. In either case, the computing device 102 may include an application that will connect the computing device 102 to the Agglomerator 104. As a result, the Agglomerator 104 will attempt to transmit, receive, copy, mine, track, and analyze data and metadata on the computing device 102.

Generally the way that the Agglomerator 104 attempts to transmit, receive, copy, mine, track, and analyze data and metadata on the computing device 102 is through the operation of software loaded on the computing device 102. This software is typically known as application software (known generally as "application(s)" or just "app(s)").

Typically application software is software used by a computing device 102 that has been designed to help the User 106 perform specific tasks. Examples include enterprise software, accounting software, office suites, games, communications, utility, and media players and the like. Application software can be contrasted from system software and middleware, which manage and integrate the capabilities of the computing device 102, but typically do not directly apply in the performance of tasks that benefit the user. The system software serves the application software, which in turn is thought to serve the User 106. However, some application software either by intent or lack thereof (i.e. use of a software development kit ("SDK") without understanding the code) may result in an application software having a Trojan horse function. A Trojan horse is historically a malicious file or program that does not attempt to inject itself into other files like a computer virus rather it often masquerades as a legitimate request or program. Trojan horses can make copies of themselves, steal information, or harm their host computing device. The first and many current Trojan horses attempt to appear as helpful programs.

Therefore, while many apps have been developed to help the User 106 some of these apps also allow the Agglomerator 104 to transmit, receive, copy, mine, track, spy on, and analyze data and metadata on the computing device 102. In this example, "mined," "tracked" or "spied" each refer to aspects of unauthorized use of User's 106 data and metadata associated with a User's 106 use of a computing device 102 and the computing device 102 itself.

As such, in this example, the SOD is utilized to help block, manage, and control the operation of different types of application software loaded on the computing device 102. The SOD is capable of performing these functions because the SOD includes logic, component, software and/or hardware capable of performing the methods that include: blocking receipt by the Agglomerator 104 of at least one of data and metadata associated with a User's 106 computing device 102; blocking transmission of at least one of data and metadata associated with a User's 106 computing device 102; allowing transmission of a decoy information that includes at least one of data and metadata associated with a User's 106 computing device 102 which is not the true data and metadata associated with a User's 106 computing device 102; allowing transmission of at least one of data and metadata associated with a User's 106 computing device 102 mined, tacked or spied by a third party application of the Agglomerator 104 including specific software code; collecting and/or counting attempts to mine, track or spy User 106 data and metadata by an identified entity including the Agglomerator 104; reporting to one of a website and a User 106 attempts to mine, track or spy User 106 data and metadata by an identified entity including the Agglomerator 104; providing a notice directed to the one or more Agglomerator 104 servers advising the server that the User 106 it is tracking, mining, or spying on data and/or metadata is transmitting decoy information; and providing a page, link or uniform resource locator ("url") directed to one or more Agglomerator 104 servers that the User 106 it is tracking, mining, or spying on data and/or metadata directs or points the Agglomerator 104 to the url, page or location.

Figure 2:
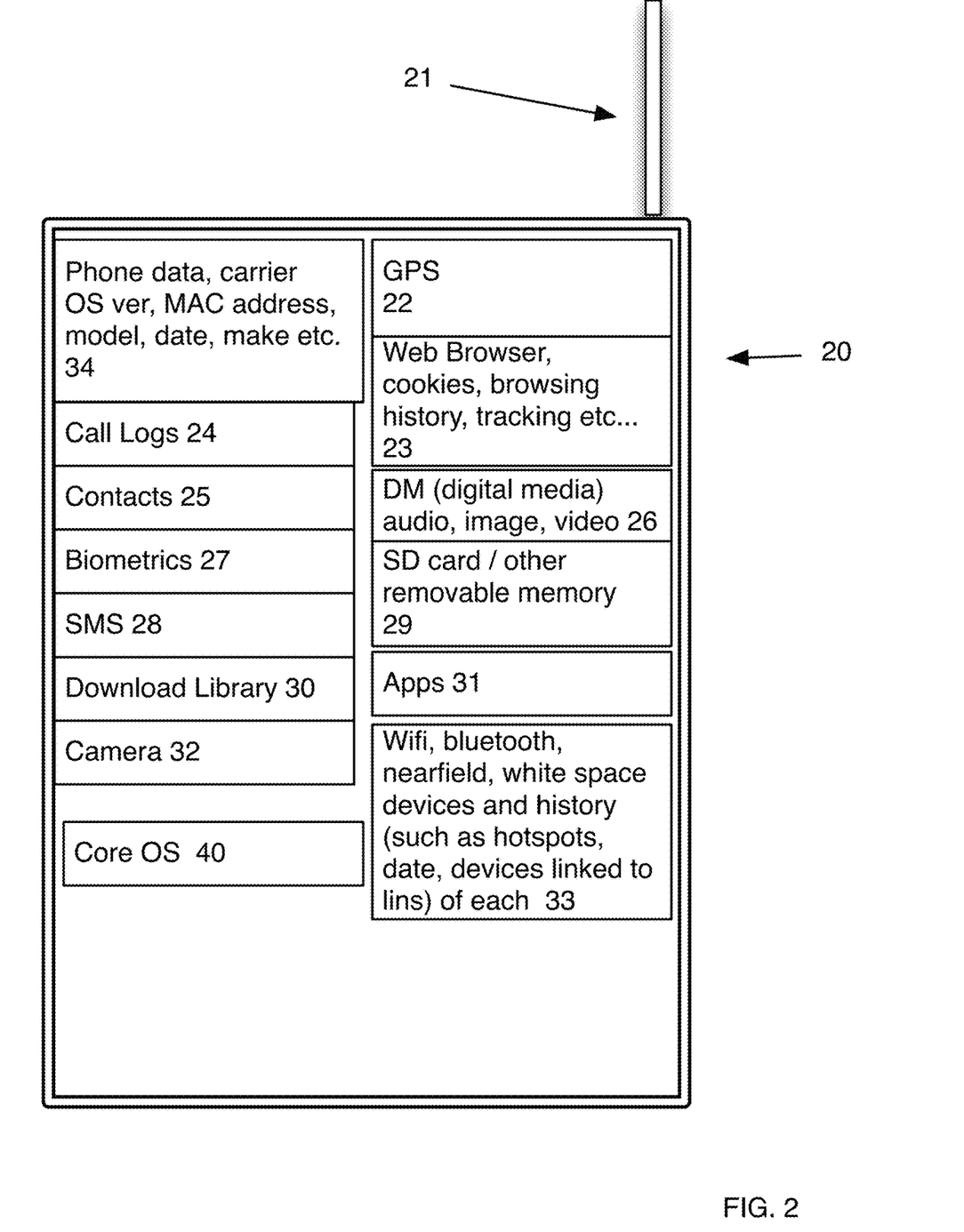
FIG. 2 is a diagrammatic system overview of the computing device shown in FIG. 1.

FIG. 2 is a diagrammatic overview of a computing device 20 shown in FIG. 1 (as computing device 102). In this case the computing device 20 has an antenna 21. The antenna 21 may be optional as the computing device 20 can be connected to an Internet or servers via hardwire. The components hardware and software shown are not intended to be an exclusive list and merely illustrate that the computing device in FIG. 2 has multiple functions and may also be referred to as a "smart" device such as a smart television or appliance, smartphone, laptop, notebook, netbook, desktop, or tablet computer. Hardware and software functions include GPS 22, Web Browser, cookies, browsing history, tracking etc. . . . 23, call logs 24, contacts 25, DM (digital media) audio, image, video 26, biometrics 27, SMS 28, SD card/other removable memory 29, Download Library 30, Apps 31, Camera 32, Wi-Fi®, Bluetooth®, near-field, white space devices and history (such as hotspots, date, devices linked to computing device wirelessly) of each 33 and Core OS (operating System) 40.

Figure 3:
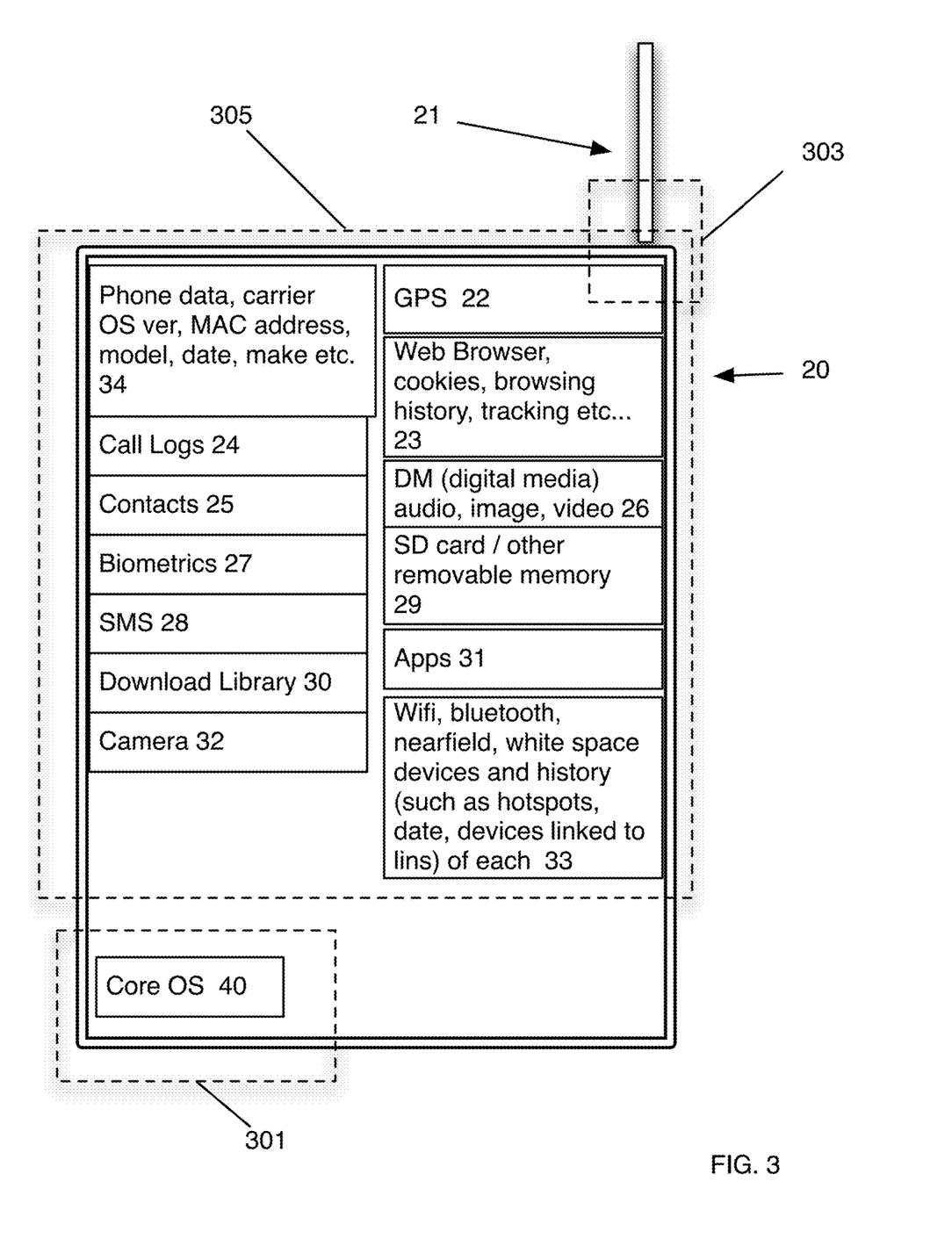
FIG. 3 is a diagrammatic system overview of a computing device with the SOD and an overview of a non-invasive augmentation of core kernel functions (NACKF).

FIG. 3 is a diagrammatic overview of a computing device 20 and an overview of a non-invasive augmentation of core kernel functions ("NACKF") of the SOD. NACKF may reside in or with the core kernel 301, NACKF may reside in a hardware or software aspect of the antenna including but not limited to the transmit and/or receive functions 303. NACKF may reside in or with non-system core kernel functions and/or first party and third party applications 305.

It is appreciated by those skilled in the art that a kernel in the technical art of computing refers to the main component of most computer operating systems. It is the bridge between the software applications and the actual data processing done at the hardware level. The kernal's responsibilities typically includes managing the system's resources such as the communication between the hardware and software components. Usually, as a basic component of an operating system, the kernel can provide the lowest-level abstraction layer for the resources (especially processors and I/O devices) that application software must control to perform its function. It typically makes these facilities available to application processes through inter-process communication mechanisms and system calls.

Figure 4:
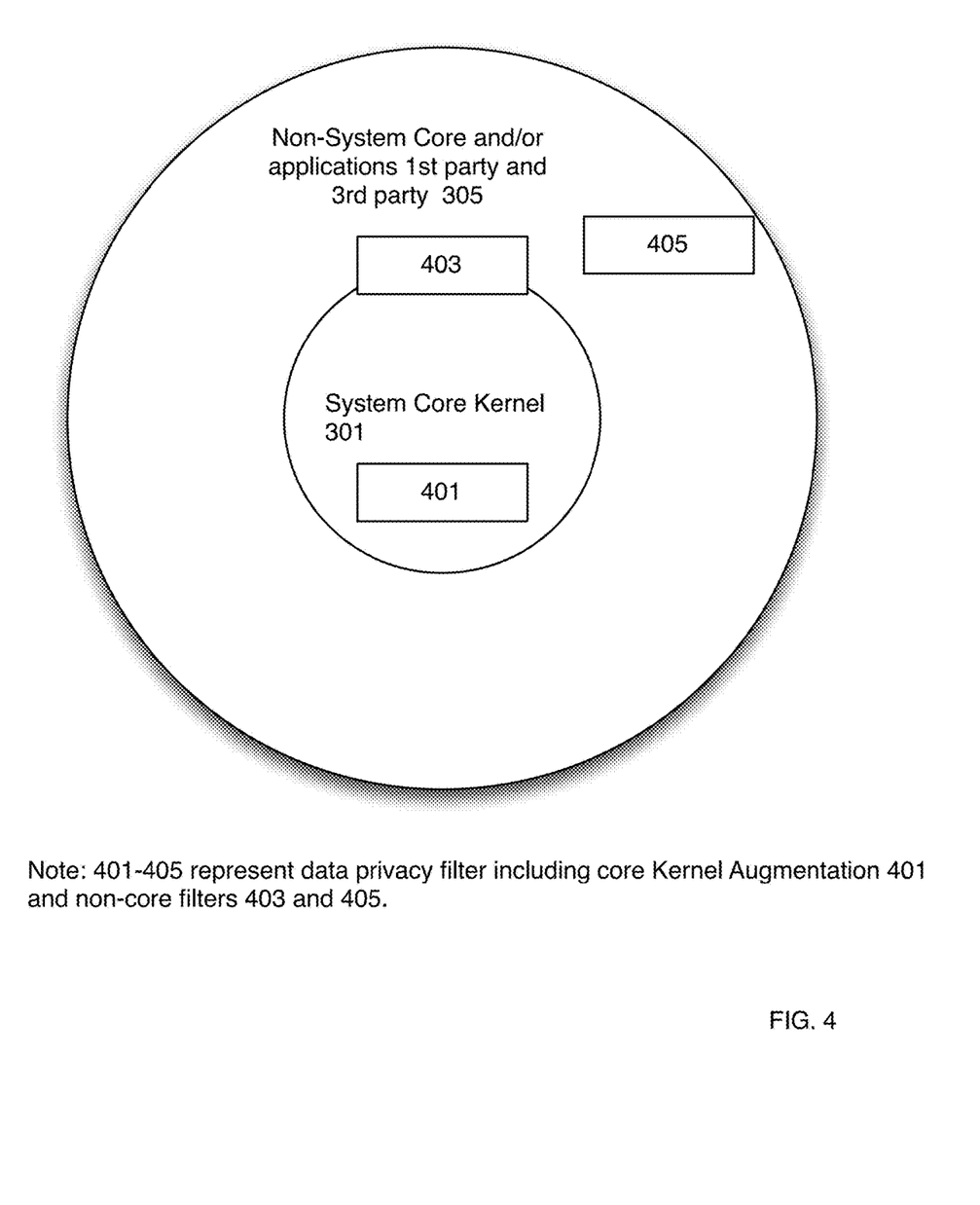
FIG. 4, a block diagram showing the system core kernel and associated core NACKF of the SOD residing in the system core kernel is shown.

Turning to FIG. 4, a block diagram showing the system core kernel 301 and associated core NACKF 401 of the SOD residing in the system core kernel is shown. A bridge NACKF 403 may also reside partially in the system core kernel 301 and partial in the non-core kernel 305. And the non-core NACKF 405 may reside in the non-core kernel 305.

The NACKF is a gatekeeper. They load with the system kernel and become a single point to allow in, refuse and/or escort requests such as obtain, report, mine, tacking, read, get, acquire and analyze something in the computing device memory by a non-User (or non-core) app, website or device. For example, an App that provides a weather update may request GPS location from the core kernel. The NACKF acts as a filter, front man and or gatekeeper and decides if the request is from an approved (authenticated, verified or "safe" source) if yes then the GPS location is reported. If no then the GPS may be not reported, or reported as computing device has no GPS. If however a third party app for playing with aviary drones requests GPS location, the NACKF may decide no and provide either a response of no GPS, a false location, a data string no associated with a location, random data, or software. A not approved requestor may also be counted and/or reported.

In some instances the NACKF decoy data set may contain one of all fabricated data and at least some real data but will in addition add a e-tag which acts as an identifier, beacon, fingerprint or the like to establish that the Agglomerator attempt to mine the User. The e-tag may be encrypted. The e-tag may include date, time, computing device information and/or GPS to help pinpoint the mining event, mining entity and date and time of the intrusion. Said e-tag data may also be stored on the Computing Device and/or on a database remote from the User's computing device.

In some instances the NACKF decoy data set may contain at one of at least all fabricated data and some real data but will in addition add a e-prion which in and of itself is innocuous and not harmful or malicious to the Agglomerator server. However, if an Agglomerator mines a sufficient number of e-prions, said e-prions can self-assemble into a function. Said function may be directed at the Agglomerator server's operation, controls, core, non-core, memory and data libraries and/or it may cause Agglomerator server to in some fashion report or admit its mining of Users.

Figure 5:
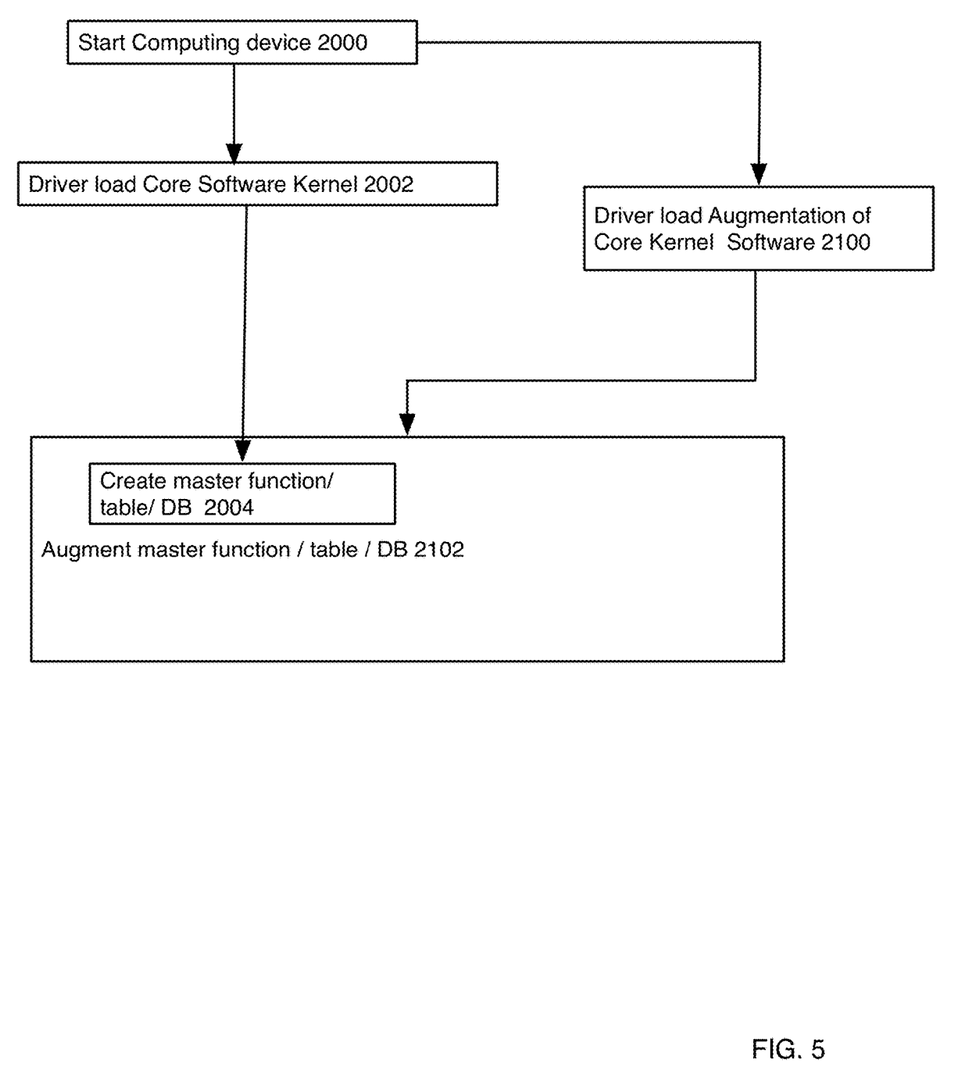
FIG. 5 shows flowchart of an example of an implementation of the process performed the NACKF while operating.

FIG. 5 shows flowchart of an example of an implementation of the process performed the NACKF while operating. In general, the process starts in step 2000 when the computing device is enable and starts to function. The core software kernel is then driver loaded in step 2002. The NACKF software is then either simultaneously loaded or later driver loaded in step 2100. Then in step 2004, a master function/table/database ("DB") is created after the core software kernel is then loaded in step 2002 either before or after the NACKF software is loaded in step 2100. Once the NACKF software is loaded, an Augmented master function/table/DB is created in step 2012.

The Augmented master table has NACKF entries which the NACKF can intercede, grab or hook a request before it reaches the core system and jump/point the request (thereby filtering/shielding the core table) to the augmented master table 2102 if the request is not credible (authentic or okayed), conversely the NACKF can point or escort the request back to the real master table entries if said request is approved.

In other words, the NACKF is analogous to a system guard, a gatekeeper, an escort, bouncer, policeman or the like apply the non-augmentation of core kernel engine function to parse one or more incoming requests based on permitted/authentic or blocked/not blocked from one of first party apps, third party apps and the Agglomerator.

Figure 6:
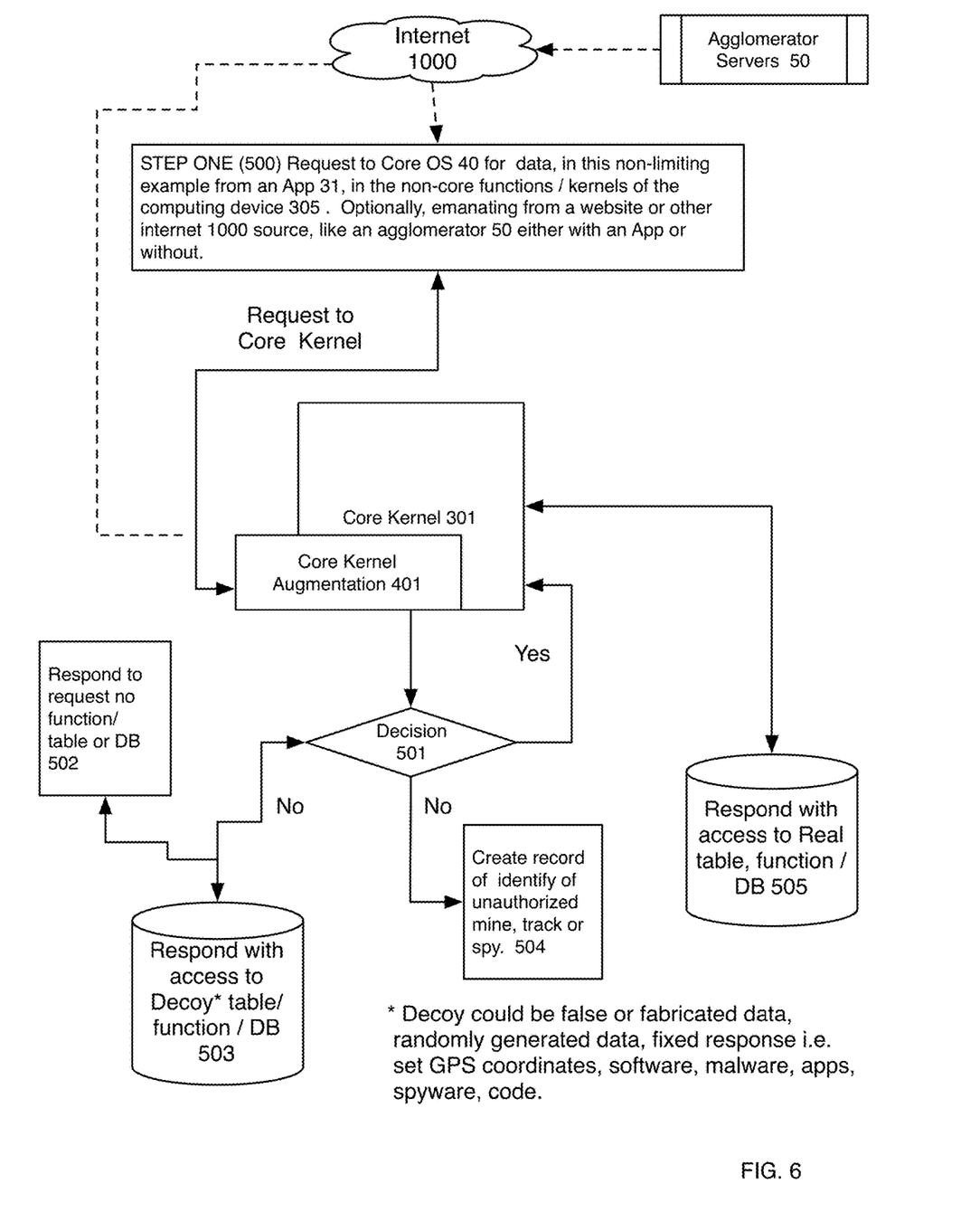
FIG. 6 shows flowchart of an example of an implementation of another process performed the NACKF while operating.

FIG. 6 shows a flowchart of an example of an implementation of another process performed by the NACKF while operating. In general, the process includes the following steps. Step One: (500) Request to Core OS 40 for data, in this non-limiting example from an App 31, in the non-core functions/kernels of the computing device 305. Optionally, emanating from a website or other internet 1000 source, like an Agglomerator 50 either with an App or without. Start Computing device 2000. Step Two: Request is received not by core kernel 301 but by Core Kernel Augmentation 401. Step Three: Decision and or Rule engines are applied. Step Four A: If request is not approved then respond to request no function/table or DB 502. Step Four B: If request is not approved then respond with access to Decoy table/function/DB 503. Decoy could be false or fabricated data, randomly generated data, fixed response i.e. set GPS coordinates, software, malware, apps, spyware, and/or code. Step Five: Optional create record of identify of unauthorized mine, track or spy. 504. Step Four C: If request is approved then Respond with access to Real table, function/DB 505 Respond with access to Real table, function/DB 505. In some instances the request may come from the internet 1000 and/or an Agglomerator server 50.

Below is an example of an implementation for a "generic" pseudo code. Those of ordinary skill in the art will recognize that the scope of this example and this application is intended to, and extends to, many operating systems including Apple®, Microsoft®, Google®, car navigation systems, gaming systems and other smart devices with an OS that has access to databases and libraries which monitor, record, track and keep information about the User's habits, actions, browsing, movements, likes dislikes, friends, contacts, texts, photos, call logs and the like.

Figure 7:
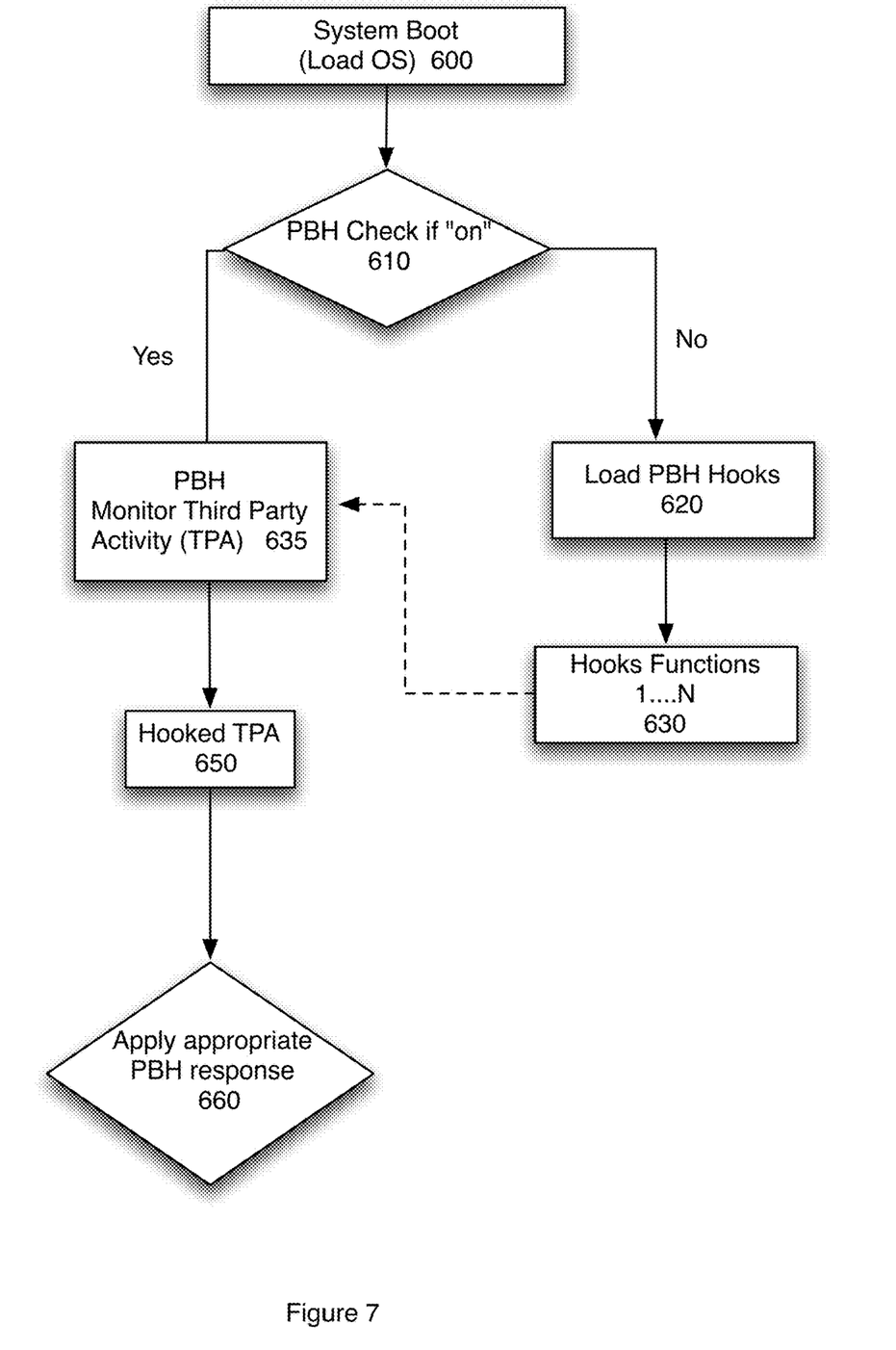
FIG. 7 shows flowchart of an example of an implementation of yet another process performed the NACKF while operating.

FIG. 7 shows flowchart of an example of an implementation of yet another process performed the NACKF while operating. The flowchart shows an overview of the SOD (which may be also referred to a Paper Bag Head™ or PBH™ system) which in a non-invasive fashion protects Core Kernel functions (NACKF) of an OS. In this exemplar a Third Part Activity ("TPA") requesting data or metadata off a computing device is hooked by the PBH system. Those of ordinary skill in the art will recognize that a First Party App ("FPA") may in some instances contain code that makes such a request and would therefore be considered to act like a TPA or be a vehicle for a TPA. Accordingly, the scope of this disclosure regarding FIGS. 7-9 includes such FPAs.

A TPA may be web based (i.e. Facebook®, Google®, Wal-Mart®) or from an App, Malware or spyware and includes requests to computing device and peripherals attached thereto. TPA includes a camera, microphone, records, digital media, libraries, files, databases and tables such as GPS, Wi-Fi®, Bluetooth®, browser history, messages, images (such as jpegs, tiffs, raw, etc.), mpegs, audio, contacts, usage, records, call logs, cookies and the like.

In this example the system boots by loading the OS 600 on the computing device 605; PBH function checks if it is on/or off 610; if "off" PBH loads PBH hooks 620; Hook functions 1 . . . N are loaded 630; if PBH is "on" then PBH monitors for TPA 635; and if TPA activity occurs PBH hooks the TPA 650.

Once TPA is hooked PBH applies the appropriate response 660. The Response includes such things as no response, false response, and accurate response. PBH decisions the response and applies rules to decide if TPA request is passed to the system.

Figure 8:
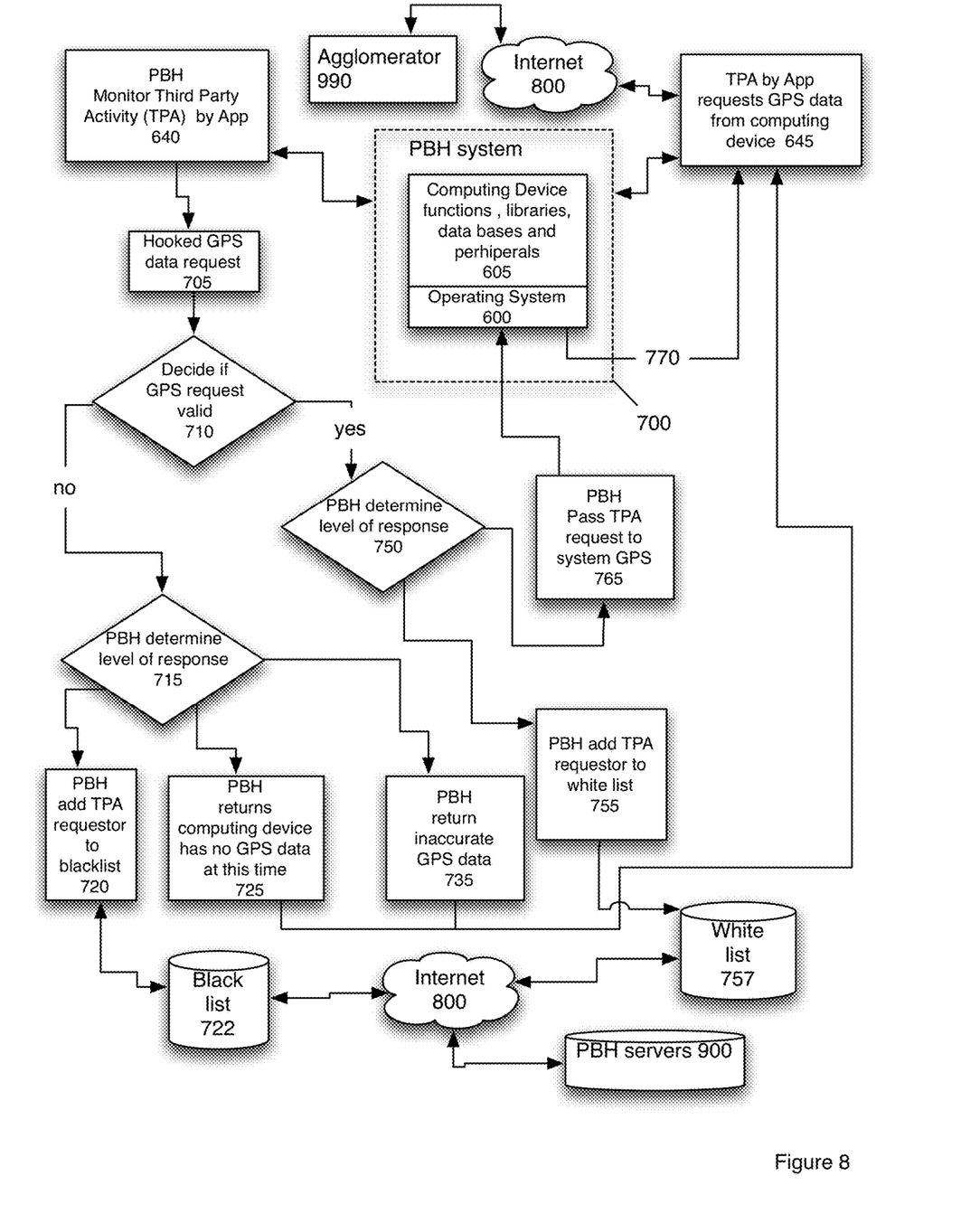
FIG. 8 shows flowchart of an example of an implementation of still another process performed the NACKF while operating.

FIG. 8 shows flowchart of an example of an implementation of still another process performed the NACKF while operating. In this process, the computing device its operating system 600 functions, libraries, data bases and peripherals 605 are shielded from a TPA App's invalid request via the SOD system 700. The process may perform steps that include: STEP ONE: PBH Monitors TPA requests from an App 640; STEP TWO: TPA App requests GPS data from computing device 645; STEP THREE: The PBH system 700 hooks the TPA GPS data request 705; and STEP FOUR: PBH decision and rule engines determine if GPS request is valid (valid may mean from a permitted third party or allowed via user preferences based on some other parameter) 710. The PBH engines may use local or remote look up tables ("LUT"), databases and libraries in decisioning if a request is valid. The PBH engines may query PBH servers for validation.

In some instances by constructing PBH server databases utilizing, at least in part, the volume of PBH system users reporting types and frequency of TPA requests the database is updated. Such updates may be uploaded to local PBH systems on computing devices. Other database data at PBH servers may be derived by analyzing popular Apps or websites for TPA.

The PBH system, in some instances, will update remote PBH servers, databases LUT, etc. as part of keeping PBH up to date and speeding up its decision making in some situations, where another PBH user or system has encountered an issue and has updated these remote resources, keeping local clients updated and/or with access to the remote PBH server data may optimize some operations and improve accuracy.

The process may also include STEP FIVE, if invalid then PBH decision and rule engines determine level of response 715. Potential responses, order is not significant, and multiple responses are allowed. The process may further include STEP SIX A, PBH adds TPA requestor to a blacklist database 720. Blacklisted TPA requestors (which also may include the App being used in conjunction with, or in place of, the requestor) are identified in a database which may be one or more of local on the computing device and remote 722 on servers, including but not limited to internet 800 connected servers, such as PBH servers 900.

The process may also include: STEP SIX B: PBH responds to TPA App request 645 that computing device has no GPS data at this time 725; This step may include TPA App using internet 800 to report to an Agglomerator 990 that computing device has no GPS; and STEP SIX C: PBH responds to TPA App request 645 with inaccurate GPS data 735; This step may include TPA App using internet 800 to report to an Agglomerator 990 computing devices inaccurate GPS. A table, database, record or library of false GPS data may be used to report false GPS. Alternatively an inaccurate GPS location generator algorithm may be used.

Figure 9:
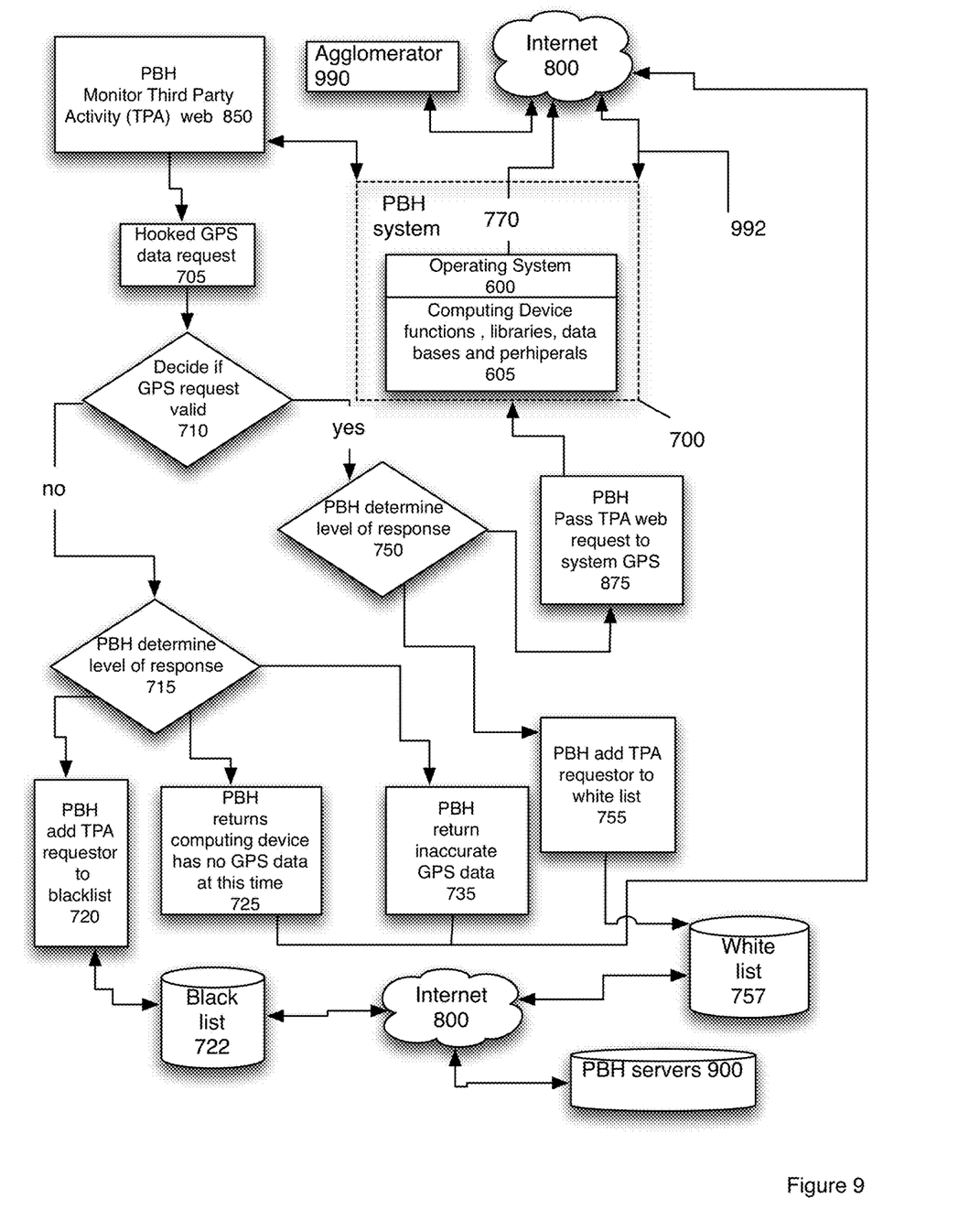
FIG. 9 shows flowchart of an example of an implementation of yet another process performed the NACKF while operating.

FIG. 9 shows flowchart of an example of an implementation of yet another process performed the NACKF while operating. A computing device 605 it's operating system's 600 functions, libraries, data bases and peripherals 605 are buffered from a TPA valid request 992 via a Paper Bag Head system 700. The process may include the following steps. STEP ONE: PBH Monitors TPA request from web based source 850. STEP TWO: TPA App requests GPS data from computing device 645. STEP THREE: The PBH system 700 hooks the TPA GPS data request 705. STEP FOUR: PBH decision and rule engines determine if GPS request is valid (valid may mean from a permitted third party or allowed via user preferences based on some other parameter) 710. STEP FIVE: If valid then PBH decision and rule engines determine level of response 750. Potential responses, order is not significant, and multiple responses are allowed. STEP SIX A: PBH adds TPA requestor to a white list database 755. Whitelisted TPA requestors are identified in a database which may be one or more of local on the computing device and remote 757 on servers, including but not limited to internet 800 connected servers, such as PBH servers 900. STEP SIX B: PBH system 700 passes TPA request for GPS data to computing device 605 and operating system 600, which receives request. STEP SEVEN: Operating system 600 provides GPS data 770 to TPA over the internet 800 to an Agglomerator 990.

Depending on the operating system the API/System file function codes will differ but the mechanism will be substantially the same for Android®, iOS, Microsoft® Windows® Mobile, Symbian, etc. For this example, the OS file that has the functions which are hooked will be called System.dll It is appreciated by those skilled in the art that the disclosed pseudo code is an informal high-level description of the operating principle of a computer program or other algorithm. A pseudo code example of aspects of the SOD are shown below as follows.

```
Call PBH function: [Check_If_PBH_is_LOADED] (This checks to see
if we are currently loaded and have installed our hooks to the system level
functions including but not limited to; GPS, WIFI, BLUETOOTH,
BROWSER (AND RELATED - COOKIES, ETC)).
If NOT Loaded then Call PBH Function: [LOAD_PBH_HOOKS]
Load PBH "hooks" the functions, so that when another application or
website tries to get data from say the GPS, the request comes to us first
and we decide how to respond.
* Operational example of an application trying to get GPS data:
Downloaded APP running makes function call to request GPS data:
App calls "get GPS data" - this gets passed directly to:
[PBH_GPS_HOOK]
```

As an example, the SOD disclosed in this application contains code that makes all requests to the GPS first go through the following process.

```
Call check_if_on_black_list( );
If on black_list;
Then;
Call blacklist_gps_data_return( ); - system depending on user prefrences
or presets will return junk data or made up coordinates;
Else;
Call check_if_gps_caller_valid(valid); - check if it is a valid request
based on criteria;
If valid!= zero (not friendly) then Call Alert_User( ); - this either asks the
user yes or no, or based on user preferences does that action;
Else CALL_ORIGINAL_GPS_SYSTEM_FUNCTION( ); - this passes
request to original function and returns the proper GPS data
RET; exits.
```

Although the previous description only illustrates particular examples of various implementations, the invention is not limited to the foregoing illustrative examples. A person skilled in the art is aware that the invention as defined by the appended claims can be applied in various further implementations and modifications. In particular, a combination of the various features of the described implementations is possible, as far as these features are not in contradiction with each other. Accordingly, the foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A non-invasive Sentinel System for an Online Device (SOD) configured to secure the SOD from unauthorized access of data and metadata on the SOD, the non-invasive SOD comprising:
   (a) a Paper Bag Head™ (PBH™) system configured to monitor a Third Party Application (TPA) requests from a TPA for data or metadata off a computing device of the SOD;
   (b) a core software kernel loaded into the operating system of the computing device of the SOD whenever the SOD is enabled and starts to function; and
   (c) a non-invasive augmentation of core kernel functions (NACKF) residing on the core software kernel of the SOD;
   wherein whenever a TPA requests data or metadata of the computing device of the SOD, prior to the TPA data request being passed to the core software kernel, the PBH™ system is further configured to hook the TPA data request with a hook function associated with the TPA and using PBH Decision and Rule Engines of the PBH™ system, determines if the TPA data request is valid or invalid and also determines the proper level of response to the TPA request.

2. The non-invasive SOD of claim 1, wherein the PBH™ system is further configured to provide at least one of the following responses to a TPA requestor if the TPA data request is determined to be invalid:
add the TPA requestor to a blacklist database;
respond to the TPA request that the computing device has no data; and
respond to the TPA request with inaccurate data.

3. The non-invasive SOD of claim 1, wherein the PBH™ is further configured to pass the TPA request to the core kernel if the request for data is determined to be valid.

4. The non-invasive SOD of claim 1, wherein the PBH™ is further configured to add the TPA request to a black list database if the request for data is determined to be invalid.

5. The non-invasive SOD of claim 2 wherein the inaccurate data in the response to the TPA request is one or more of a group consisting of false or fabricated data, randomly generated data, a fixed response, software, malware, an app, spyware, and executable code.

6. The non-invasive SOD of claim 1 wherein the PBH™ system is further configured to monitor First Party Application (FPA) requests from a FPA for data or metadata off a computing device of the SOD.

7. The non-invasive SOD of claim 1 wherein the PBH™ system is further configured to monitor data requests from a plurality of Agglomerators comprising entities capable of tracking a user's data or metadata off a computing device of the SOD.

* * * * *